United States Patent
Sakata et al.

(10) Patent No.: US 8,401,162 B2
(45) Date of Patent: Mar. 19, 2013

(54) TELEPHONE RELAY SYSTEM, TELEPHONE RELAY APPARATUS AND TELEPHONE RELAY METHOD

(75) Inventors: Kazuhiro Sakata, Tokyo (JP); Akihisa Kurashima, Tokyo (JP)

(73) Assignee: NEC Corporation, Tokyo (JP)

( * ) Notice: Subject to any disclaimer, the term of this patent is extended or adjusted under 35 U.S.C. 154(b) by 790 days.

(21) Appl. No.: 12/521,024

(22) PCT Filed: Nov. 5, 2007

(86) PCT No.: PCT/JP2007/071479
§ 371 (c)(1),
(2), (4) Date: Nov. 19, 2009

(87) PCT Pub. No.: WO2008/078458
PCT Pub. Date: Jul. 3, 2008

(65) Prior Publication Data
US 2010/0098229 A1 Apr. 22, 2010

(30) Foreign Application Priority Data
Dec. 27, 2006 (JP) .................................. 2006-350812

(51) Int. Cl.
*H04M 1/56* (2006.01)
(52) U.S. Cl. ............................... 379/142.04; 379/212.01
(58) Field of Classification Search ............ 379/216.01, 379/220.01–221.14, 350, 142.01–142.18, 379/212.01; 370/351
See application file for complete search history.

(56) References Cited

U.S. PATENT DOCUMENTS

| 7,103,168 B2 * | 9/2006 | Bedingfield et al. ...... 379/216.01 |
| 2007/0189264 A1 * | 8/2007 | Liu ............................... 370/351 |

FOREIGN PATENT DOCUMENTS

| JP | 1991029447 A | 2/1991 |
| JP | 1991285440 A | 12/1991 |
| JP | 2000049947 A | 2/2000 |
| JP | 2001268230 A | 9/2001 |
| JP | 2004096249 A | 3/2004 |
| JP | 2004343440 A | 12/2004 |

OTHER PUBLICATIONS

J. Rosenberg et al., "Best Current Practices for Third Party Call Control (3pcc) in the Session Initation Protocol (SIP)", Network Working Group, RFC 3725, Apr. 2004, p. 1-31.

* cited by examiner

Primary Examiner — Duc Nguyen
Assistant Examiner — Assad Mohammed

(57) ABSTRACT

The present invention provides a telephone relay apparatus in which even in a telephone terminal which cannot recognize a subaddress, it is possible to attain information to judge whether or not the call is to be started. A telephone relay apparatus 100 possesses a plurality of call transmission telephone numbers (proxy telephone numbers) to uses a telephone number (user telephone number) properly to transmit a call to a telephone terminal 210 on the call reception side according to a rule prescribed in advance, which enables the telephone terminal 210 on the call reception side to identify the type of the call via the telephone relay apparatus 100 based on the call transmitter telephone number (notification telephone number).

14 Claims, 8 Drawing Sheets

F I G. 3

```
USER INFORMATION
USER IDENTIFIER    USER TELEPHONE NUMBER    PROXY TELEPHONE NUMBER
000001             09012345678              05011110001
000002             09011111111              05011110002
000003             08022222222              05011110003
```

F I G. 4

```
TELEPHONE NUMBER INFORMATION
TELEPHONE NUMBER    NOTIFICATION
IDENTIFIER          TELEPHONE NUMBER
01                  05022220001
02                  05022220002
03                  05022220003
```

F I G. 5

```
NOTIFICATION TRANSMITTER NUMBER CONDITION INFORMATION (USER IDENTIFIER 000001)
CONDITION→TELEPHONE NUMBER IDENTIFIER TO BE USED
TRANSMITTER NUMBER IS 09022222222→01
TRANSMITTER NUMBER IS 09033333333→02
TRANSMITTER NUMBER BEGINS WITH  044431→01
TRANSMITTER NUMBER BEGINS WITH  033344→02
TRANSMITTER NUMBER NOT NOTIFIED→03
OTHERS→03
```

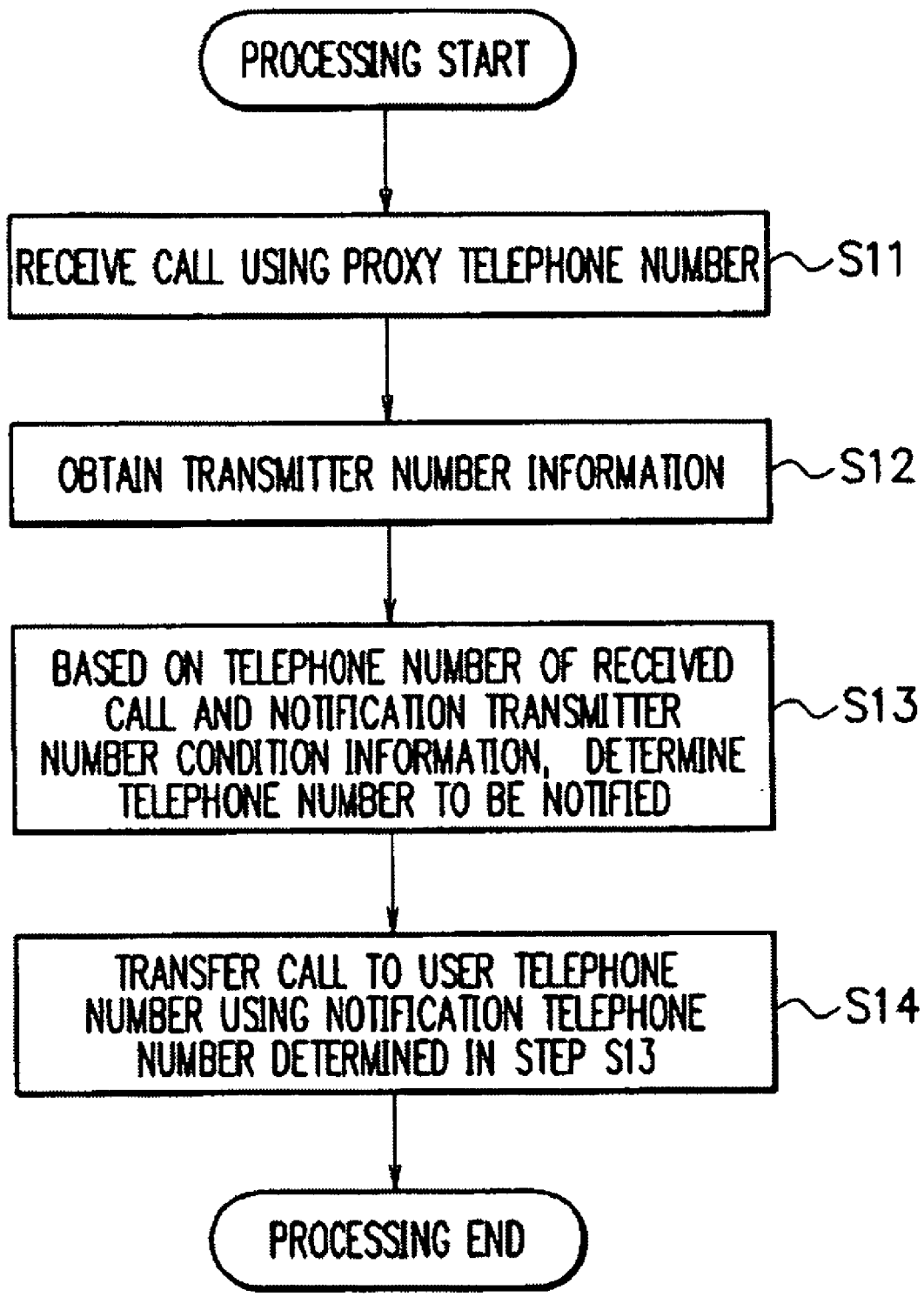

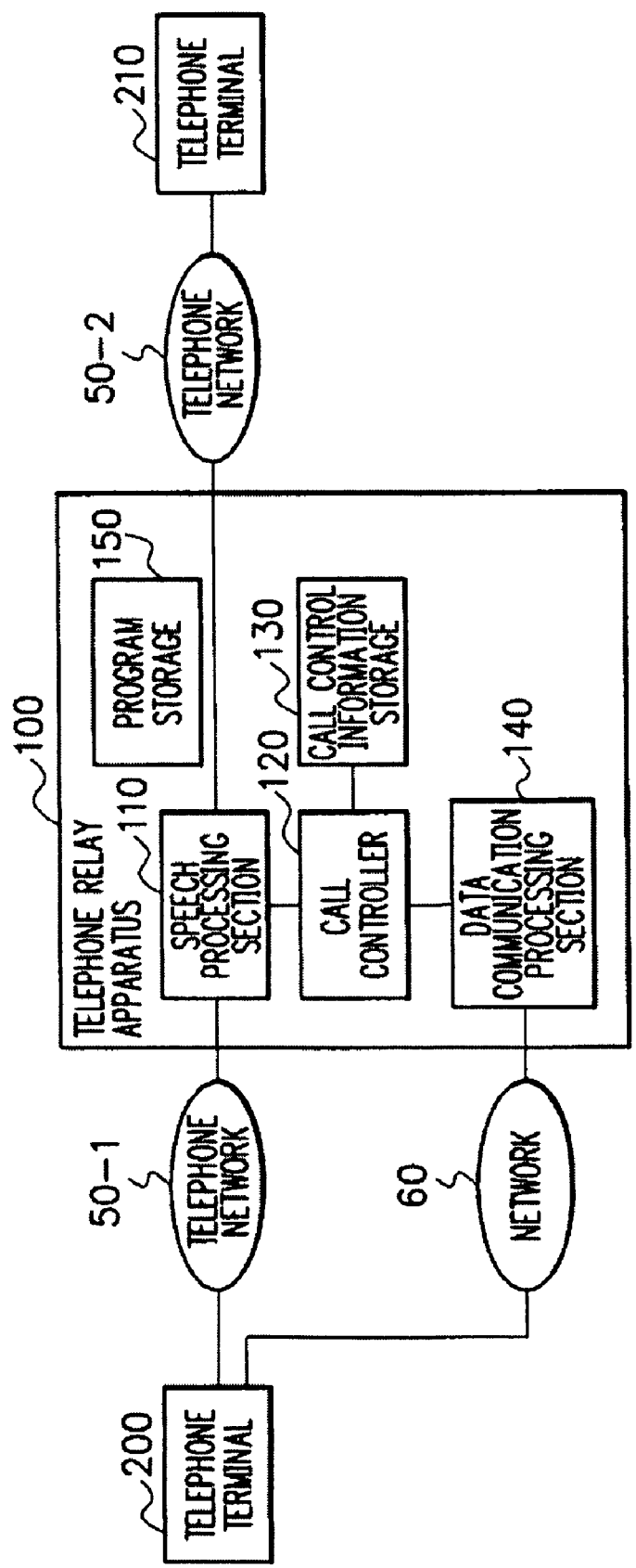

TELEPHONE RELAY SYSTEM, TELEPHONE RELAY APPARATUS AND TELEPHONE RELAY METHOD

TECHNICAL FIELD

The present invention relates to a telephone relay system, a telephone relay apparatus, and telephone relay method, and in particular, to a telephone relay system, a telephone relay apparatus, and telephone relay method for controlling third party call control or transferring is carried out.

RELATED ART

There has been disclosed an invention of a telephone relay apparatus for identifying a call transmitter by a call transmitter telephone number notification service and transferring a received call to a transfer destination registered in advance (reference is to be made to, e.g., Patent Documents 1 to 3).

In Patent Documents 1 to 3, there have been described ISDN (integrated services digital network) terminal modules; in the modules described in Patent Documents 1 and 2 among these terminal modules, when a call is received, a telephone number of a call transmitter is obtained from call reception information sent from the ISDN communication line and a transfer destination is identified by referring to a transmission destination table to which a transmission destination for the telephone number of the call transmitter is registered, to transfer the received call to the transmission destination.

Also, according to the ISDN terminal module described in Patent Document 3, also in the transfer processing, a call transmitter telephone number (transmitter number) is included in a subaddress to be notified to the transfer destination.

Further, Non-Patent Document 1 has disclosed an invention associated with processing (steps S23 to S25 of FIG. 1) to be executed by a telephone relay apparatus, which will be described later.

Patent Document 1: Japanese Patent Laid-Open Pub. No. H 03-029447
Patent Document 2: Japanese Patent Laid-Open Pub. No. H 03-285440
Patent Document 3: Japanese Patent Laid-Open Pub. No. 2000-049947
Non-Patent Document 1: J. Rosenberg et al., "Best Current Practices for Third Party Call Control (3pcc) in the Session Initiation Protocol (SIP)", IETF RFC3725, Ericsson, April 2004, p. 1-31

DISCLOSURE OF THE INVENTION

Problem to be Solved by the Invention

A problem of the prior art described in Patent Documents 1 and 2 is that a user cannot obtain information for judging whether or not he or she should respond to a call beforehand. This is because the call transmitter telephone number (transmitter number) to be notified to the transfer destination when the above ISDN terminal module executes the transfer processing is a fixed number of ISDN terminal module and is not the number of the telephone terminal of the transmission source.

Also, a problem of the conventional technique described in Patent Document 3 is that the transmitter number cannot be known unless the call receiving telephone terminal has a function to recognize the subaddress.

It is therefore an exemplary object of the present invention to a telephone relay system, a telephone relay apparatus, and telephone relay method in which even in a telephone terminal which cannot recognize the subaddress, a user can obtain information for judging whether or not to respond to a call.

Means for Solving the Problem

To solve the above problem, the telephone relay system in accordance with an exemplary aspect of the present invention is a telephone relay system in which a telephone relay apparatus receives a call transmitted from a first telephone terminal to transfer the call to a second telephone terminal, wherein the telephone repay apparatus includes user information storage means for storing a proxy telephone number to be employed when a call is transmitted from the first telephone terminal to the telephone relay apparatus, and a user identifier and a user telephone number of a transfer destination which are disposed in association with the proxy telephone number; notification transmitter number information storage means for storing information of a correspondence between a telephone number of the first telephone terminal which are transmitted to the telephone relay apparatus when the call is transmitted from the first telephone terminal to the telephone relay apparatus and a telephone number identifier, the information disposed in association with the user identifier; telephone number information storage means for storing information of a correspondence between the telephone number identifier and a notification telephone number; and call control means for identifying the notification telephone number based on the proxy telephone number employed when the call is transmitted to the telephone relay apparatus, and transferring the call to the user telephone number by use of the notification telephone number.

Further, the telephone relay apparatus in accordance with an exemplary aspect of the present invention is a telephone relay apparatus for use with a telephone relay system in which the telephone relay apparatus receives a call transmitted from a first telephone terminal to transfer the call to a second telephone terminal, including user information storage means for storing a proxy telephone number to be employed when a call is transmitted from the first telephone terminal to the telephone relay apparatus, and a user identifier and a user telephone number of a transfer destination which are disposed in association with the proxy telephone number; notification transmitter number information storage means for storing information of a correspondence between a telephone number of the first telephone terminal which are transmitted to the telephone relay apparatus when the call is issued from the first telephone terminal to the telephone relay apparatus and a telephone number identifier, the information disposed in association with the user identifier; telephone number information storage means for storing information of a correspondence between the telephone number identifier and a notification telephone number; and call control means for identifying the notification telephone number based on the proxy telephone number employed when the call is transmitted to the telephone relay apparatus, and transferring the call to the user, telephone number by use of the notification telephone number.

Moreover, the telephone relay method in accordance with an exemplary aspect of the present invention is a telephone relay method in which a telephone relay apparatus receives a call transmitted from a first telephone terminal to transfer the call to a second telephone terminal, wherein the telephone relay apparatus includes a user information storage for storing a proxy telephone number to be employed when a call is transmitted from the first telephone terminal to the telephone relay apparatus, and a user identifier and a user telephone number of a transfer destination which are disposed in association with the proxy telephone number; a notification transmitter number information storage for storing information of a correspondence between a telephone number of the first telephone terminal which are transmitted to the telephone relay apparatus when the call is transmitted from the first telephone terminal to the telephone relay apparatus and a telephone number identifier, the information disposed in association with the user identifier; and a telephone number information storage for storing information of a correspondence between the telephone number identifier and a notification telephone number, wherein the telephone relay apparatus includes a call control step for identifying the notification telephone number based on the proxy telephone number employed when the call is transmitted to the telephone relay apparatus, and transferring the call to the user telephone number by use of the notification telephone number.

Additionally, the program in accordance with an exemplary aspect of the present invention is a program for a telephone relay method in which a telephone relay apparatus receives a call transmitted from a first telephone terminal to transfer the call to a second telephone terminal, wherein the telephone relay apparatus includes a user information storage for storing a proxy telephone number to be employed when a call is transmitted from the first telephone terminal to the telephone relay apparatus, and a user identifier and a user telephone number of a transfer destination which are disposed in association with the proxy telephone number; a notification transmitter number information storage for storing information of a correspondence between a telephone number of the first telephone terminal which are transmitted to the telephone relay apparatus when the call is transmitted from the first telephone terminal to the telephone relay apparatus and a telephone number identifier, the information disposed in association with the user identifier; and a telephone number information storage for storing information of a correspondence between the telephone number identifier and a notification telephone number, wherein the program making a computer execute a call control step disposed in the telephone relay apparatus for identifying the notification telephone number based on the proxy telephone number employed when the call is transmitted to the telephone relay apparatus, and transferring the call to the user telephone number by use of the notification telephone number.

Further, another telephone relay apparatus in accordance with an exemplary aspect of the present invention is a telephone relay apparatus connected via a telephone network to a plurality of telephone terminals, including user information storage means for storing correspondence information between a user telephone number and a proxy telephone number; notification transmitter number determination rule storage means for storing a rule to determine a notification telephone number by use of given information; telephone call receiving means for receiving a call from each of the telephone terminals; and transfer means for identifying from the user information storage means, at reception of a call by the telephone call receiving means, a user telephone number for which a telephone number having received the call is a proxy telephone number, determining a notification telephone number to be used in transfer processing, based on a transmission source telephone number notified by the received call and the rule stored in the notification transmitter number determination rule storage means, and transferring the received call to the user telephone number by use of the notification telephone number.

Also, another telephone relay apparatus in accordance with an exemplary aspect of the present invention is a telephone relay apparatus connected via a telephone network to a plurality of telephone terminals, including user information storage means for storing correspondence information between a user identifier and a user telephone number; notification transmitter number determination rule storage means for storing a rule to determine a notification telephone number by use of given information; call transmission request receiving means for receiving a call transmission request from each of the telephone terminals; and call establishing means for identifying, at reception of a call transmission request by the call transmission request receiving means, a user telephone number based on a user identifier included in the call transmission request by use of the user information storage means, determining a notification telephone number based on information included in the call transmission request and the rule stored in the notification transmitter number determination rule storage means, transmitting a telephone call to a request source telephone terminal determined by the call transmission request, transmitting a telephone call also to the user telephone number by use of the notification telephone number, and thereby connecting these two calls to each other.

Moreover, another telephone relay apparatus in accordance with an exemplary aspect of the present invention is a telephone relay apparatus connected via a telephone network to a plurality of telephone terminals, including user information storage means for storing correspondence information between a user identifier, a user telephone number, and a proxy telephone number; notification transmitter number determination rule storage means for storing a rule to determine a notification telephone number by use of given information; notification transmitter number information storage means for storing correspondence information between a telephone number and a notification transmitter number; call transmission request receiving means for receiving a call transmission request from each of the telephone terminals; call receiving means for identifying, at reception of a call transmission request by the call transmission request receiving means, a proxy telephone number based on a user identifier included in the call transmission request by use of the user information storage means, determining a notification telephone number based on information included in the call transmission request and the rule stored in the notification transmitter number determination rule storage means, storing in the notification transmitter number information storage means a pair including a telephone number of a request source telephone terminal and the notification telephone number determined by the call transmission request, and notifying the proxy telephone number to the request source telephone terminal; telephone call receiving means for receiving a call from the request source telephone terminal; and transfer means for referring, at reception of a call by the telephone call receiving means, to the notification transmitter number information storage means based on a transmission source telephone number notified by the received call, determining a notification telephone number to be used in transfer processing, and transferring the received call to the user telephone number by use of the notification telephone number.

Furthermore, another telephone relay method in accordance with an exemplary aspect of the present invention is a telephone relay method, including a step of receiving a call from a telephone terminal; a step of identifying a user telephone number for which a telephone number having received the call is a proxy telephone number, and determining a notification telephone number to be used in transfer processing, based on a transmission source telephone number notified by the received call and a rule set in advance; and a step of transferring the received call to the user telephone number by use of the notification telephone number.

Moreover, another telephone relay method in accordance with an exemplary aspect of the present invention is a telephone relay method, including a step of receiving a call transmission request from a telephone terminal; a step of identifying, at reception of the call transmission request, a user telephone number based on a user identifier included in the call transmission request, and determining a notification telephone number based on information included in the call transmission request and a rule set in advance; and a step of transmitting a telephone call to a request source telephone terminal determined by the call transmission request, transmitting a telephone call also to the user telephone number by use of the notification telephone number, and thereby connecting these two calls to each other.

Also, another telephone relay method in accordance with an exemplary aspect of the present invention is a telephone relay method, including a step of receiving a call transmission request from a telephone terminal; a step of identifying, at reception of the call transmission request, a proxy telephone number based on a user identifier included in the call transmission request, determining a notification telephone number based on information included in the call transmission request and a rule set in advance, storing a pair including a telephone number of a request source telephone number and the notification telephone number determined by the call transmission request, and notifying the proxy telephone number to a request source telephone terminal; a step of receiving a call from the request source telephone terminal; a step of referring to notification transmitter number information storage means based on a transmission source telephone number notified by the received call and determining a notification telephone number to be used in transfer processing; and a step of transferring the received call to the user telephone number by use of the notification telephone number.

In addition, another program in accordance with an exemplary aspect of the present invention is a program installed in a telephone relay apparatus which receives a call or a call transmission request from a telephone terminal, the program making a computer execute processing described in either one of the other telephone relay methods described above.

Here, operation of the present invention will be described. In the present invention, the telephone relay apparatus possesses a plurality of call transmission telephone numbers (proxy telephone numbers) to uses a telephone number (user telephone number) properly to transmit a call to a telephone terminal on the call reception side according to a rule prescribed in advance, which enables the telephone terminal on the call reception side to identify the type of the call via the telephone relay apparatus based on the call transmitter telephone number (notification telephone number).

Advantages of the Invention

In accordance with the present invention, since there is included the above configuration, even in a telephone terminal which cannot recognize the subaddress, a user can obtain information for judging whether or not he or she should respond to the call.

BEST MODE FOR CARRYING OUT THE INVENTION

Next, referring to accompanying drawings, description will be given in detail of a best mode for carrying out the present invention.

First exemplary embodiment: FIG. 2 is a configuration diagram of a first exemplary embodiment of a telephone relay system in accordance with the present invention. Referring to this diagram, the first exemplary embodiment of the telephone relay system in accordance with the present invention includes a telephone relay apparatus 100 which operates under program control, telephone terminals 200 and 210, and telephone networks 50-1 and 50-2 to which these telephone terminals 200 and 210 connect. Incidentally, three or more telephone terminals may be connected to the telephone networks 50.

The telephone relay apparatus 100 includes a speech processing section 110, a call controller 120 to supply a call control instruction to a speech processing section 110, a call control information storage 130 in which the call controller 120 stores and refers to information required for its operation, and a program storage 150 in which a control program is stored.

FIGS. 3 to 5 show examples of information items stored in the call control information storage 130. FIG. 3 is a diagram showing an example of user information stored in the call control information storage 130. FIG. 4 is a diagram showing an example of telephone number information stored in the call control information storage 130. FIG. 5 is a diagram showing an example of notification transmitter number condition information stored in the call control information storage 130. The telephone number information of FIG. 4 and the notification transmitter number condition information of FIG. 5 are prepared to basically differ for each user identifier; however, there may be adopted information common to a plurality of user identifiers.

In the following description, it is assumed that the telephone terminal 200 is a call-transmitter-side terminal and the telephone terminal 210 is a call-receiver-side terminal.

Referring FIG. 3, the user information includes a user identifier, a user telephone number, and a proxy telephone number. The user identifier ("000001 to 000003" in the example of FIG. 3) indicates an identifier of a user of the call-receiver-side terminal, the user telephone number ("09012345678, 09011111111, 08022222222" in the example of FIG. 3) is a telephone number of a user of the call-receiver-side terminal, and the proxy telephone number ("05011110001 to 05011110003" in the example of FIG. 3) indicates a telephone number for call transmission to the telephone relay apparatus 100 in a respective way.

Further, the user identifier "000001", the user telephone number "09012345678", and the proxy telephone number "05011110001" are mutually related to each other; similarly, the user identifier "000002", the user telephone number "09011111111", and the proxy telephone number "05011110002" are mutually related to each other and the user identifier "000003", the user telephone number "08022222222", and the proxy telephone number "05011110003" are mutually related to each other.

Referring to FIG. 4, the telephone number information includes a telephone number identifier and a notification telephone number. The telephone number identifier ("01 to 03" in the example of FIG. 4) is a telephone number identifying code, and the notification telephone number ("05022220001 to 05022220003" in the example of FIG. 4) is information indicating a category (attribute information, request contents, and the like) of a call transmitter to be notified to the call-receiver-side terminal. Hence, the notification telephone number does not indicate a telephone number of the call-transmitter-side terminal (telephone terminal 200).

The notification transmitter number condition information shown in FIG. 5 corresponds to the user identifier "000001" as an example. In this fashion, the notification transmitter number condition information is disposed with a correspondence for each of the user identifiers "000001 to 000003".

"Transmitter number" shown here is a telephone number of the call-transmitter-side terminal (telephone terminal 200).

For example, the transmitter number "09022222222" corresponds to the telephone number identifier "01". Similarly, the transmitter number "09033333333" corresponds to the telephone number identifier "02", "transmitter number beginning with 044431" corresponds to the telephone number identifier "01", "transmitter number beginning with 033344" corresponds to the telephone number identifier "02", "transmitter number not notified" corresponds to the telephone number identifier "03", and the other transmitter numbers correspond to the telephone number identifier "03".

Next, referring to FIGS. 2 and 6, description will be given in detail of overall operation of the exemplary embodiment. FIG. 6 is a flowchart showing operation of the first exemplary embodiment of the telephone relay system in accordance with the present invention.

First, the telephone terminal 200 transmits a call (transmit voice speech) to a proxy telephone number possessed by the telephone relay apparatus 100. The speech processing section 110 of the telephone relay apparatus 100 receives this call (step S11 of FIG. 6).

Subsequently, the speech processing section 110 confirms transmitter number information of the telephone terminal 200 having made a telephone call (step S12 of FIG. 6). This "transmitter number information" includes a telephone number of the telephone terminal 200.

The call controller 120 of the telephone relay apparatus 100 receives these information pieces, refers to user information stored in the call control information storage 130, identifies a user identifier and a user telephone number of the call based on the proxy telephone number employed when the voice call is made from the telephone terminal 200 to the telephone relay apparatus 100; confirms, based on notification transmitter number condition information corresponding to the identified user identifier, a telephone number identifier to be used, and refers to telephone number information to identify a notification telephone number based on the telephone number identifier (step S13 of FIG. 6).

Finally, the call controller 120 instructs the speech processing section 110 such that the speech processing section 110 transfers the call to the user telephone number by using the notification telephone number identified in the previous step as the transmitter number (step S14 of FIG. 6).

Next, description will be given of an advantage of the exemplary embodiment. This exemplary embodiment is configured such that a call from the call-transmitter-side telephone terminal 200 is once terminated by the telephone relay apparatus 100 and then a call is again transmitted to the call-receiver-side telephone terminal 210 after determining a transmitter number based on the category of the call transmitter; hence, the category (attribute information, request contents, and the like) of the call transmitter can be confirmed by the call-receiver side according to the transmitter number.

Also, the exemplary embodiment is further configured such that a call from the call-transmitter-side telephone terminal 200 is once terminated by the telephone relay apparatus 100 and then a call is again transmitted by using a number different from the transmitter number of the telephone terminal 200; hence, the call-transmitter-side telephone number can be concealed from the call-receiver side.

Second exemplary embodiment: Next, description will be given of a second exemplary embodiment of the present invention. FIG. 7 is a configuration diagram of the second exemplary embodiment of the telephone relay system in accordance with the present invention. Incidentally, in this diagram, the same constituent components as those of FIG. 2 are assigned with the same reference numerals, and description thereof will be avoided.

Referring to FIG. 7, the second exemplary embodiment of the telephone relay system in accordance with the present invention includes a telephone relay apparatus 100 operating under program control, telephone terminals 200 and 210, telephone networks 50-1 and 50-2 to which these telephone terminals 200 and 210 connect, and a network 60 to connect the telephone terminal 200 to the telephone relay apparatus 100. Three or more telephone terminals may be connected to the telephone networks 50; also, a plurality of telephone terminals may be connected to the network 60.

The telephone relay apparatus 100 includes a speech processing section 110, a call controller 120 to supply a call control instruction to the speech processing section, a call control information storage 130 in which the call controller stores and refers to information required for its operation, a program storage 150 in which a control program is stored, and a data communication processing section 140 to receive via a network a request from the telephone terminal 200.

In the exemplary embodiment, information items shown in FIGS. 3 and 4 as well as information items shown in FIG. 8 are stored in the call control information storage 130. FIG. 8 is a diagram showing an example of correspondence information data between notification information and notification transmitter numbers stored in the call control information storage 130. Correspondence information between the telephone number information of FIG. 4 and notification information and notification transmitter number of FIG. 1 is prepared to basically differ for each user identifier; however, there may be adopted information common to a plurality of user identifiers.

Next, referring to flowcharts of FIGS. 1 and 7, description will be given in detail of the overall operation of the exemplary embodiment. FIG. 1 is a flowchart showing the operation of the second exemplary embodiment of the telephone relay system in accordance with the present invention.

First, the telephone terminal 200 issues via the network 60 to the telephone relay apparatus 100 a speech request including, as parameter information, telephone number information, notification attribute information, and call transmission destination identifier information. The data communication processing section 140 of the telephone relay apparatus 100 receives this request (step S21 of FIG. 1).

In the operation, the data communication processing section 140 of the telephone relay apparatus 100 passes, from the request of the telephone terminal 200, the speech request together with the request source telephone number information, the notification attribute, and the call transmission destination identifier information to the call controller 120.

The call controller 120 having received the speech request identifies a user telephone number based on call transmission destination identifier information; attains a telephone number identifier to be used, from the correspondence information (FIG. 8) between the notification attribute and the notification telephone number stored in the call control information storage 130, and refers, by use of the telephone number identifier, to the telephone number information stored in the call control information storage 130, to identify a notification telephone number based on the telephone number identifier (step S22 of FIG. 8).

And the call controller 120 sends a speech indication to the speech processing section 110 by using, as parameters, the request source telephone number information and the notification telephone number.

The speech processing section 110 having receiving this indication first transmits a call to the telephone terminal 200 as the request source (step S23 of FIG. 1).

When the telephone terminal 200 as the request source replies to the call, the speech processing section 110 then transfers a call to one other telephone terminal 210 having a user telephone number by using, as the transmitter number, the notification telephone number identified in the previous step (step S24 of FIG. 8).

When the telephone terminal 210 replies to the call, the speech processing section 110 connects voice of the call of the telephone terminal 200 to voice of the call of the telephone terminal 210 to enable a conversation between both parties (step S25 of FIG. 8).

Next, description will be given of an advantage of the exemplary embodiment. This exemplary embodiment is configured such that a call of the call-requesting telephone terminal 200 is once terminated by the telephone relay apparatus 100 and then a call is transmitted, after determining a transmitter number based on the category of the call transmitter, to the call-receiver-side telephone terminal 210; therefore, the category (attribute information, request contents, and the like) of the call transmitter can be confirmed by the call receiver side according to the transmitter number.

Next, description will be given in detail of an example of the present invention.

EXAMPLE 1

The first example is an example in which the first exemplary embodiment described above is further specifically materialized. For the first example, the configuration diagram of FIG. 2 and the flowchart of FIG. 6 are referred to. First, the telephone terminal 200 transmits a call (voice speech call transmission) to a proxy telephone number possessed by the telephone relay apparatus 100 (step S11 of FIG. 6).

Next, the speech processing section confirms call transmitter information of the telephone terminal 200 having made the telephone call (step S12 of FIG. 6).

The call controller 120 receives these information pieces, refers to user information stored in the call control information storage 130, identifies a user identifier and a user telephone number of the call based on the proxy telephone number employed when the voice call is made from the telephone terminal 200 to the telephone relay apparatus 100; confirms a telephone number identifier to be used, based on notification transmitter number condition information corresponding to the identified user identifier, and refers to telephone number information to identify a notification telephone number using the telephone number identifier (step S13 of FIG. 6).

Assume in this step that for example, the telephone number of the telephone terminal 200 having made the telephone call, namely, the telephone terminal of the call transmitter is "0444310000" and the proxy telephone number of the call transmission destination is "05011110001".

In the operation, the call controller 120 refers to the user information (FIG. 3) stored in the call control information storage 130 to obtain, based on the proxy telephone number of the call transmission destination, a user identifier to be processed here. According to the example of FIG. 3, the user identifier "000001" and the user telephone number "09012345678" can be obtained by use of the proxy telephone number "05011110001".

Further, the call controller 120 refers to the notification transmitter number condition information (FIG. 5) stored in the call control information storage 130. Specifically, when the telephone number "0444310000" of the call-transmitter telephone terminal 200 is applied to the notification transmitter number condition corresponding to the user identifier "000001", "transmitter number begins with 044431" is notified, and hence "01" is attained as the telephone identifier to be used.

Then, the call controller 120 refers to the telephone number information (FIG. 4) stored in the call control information storage 130 to acquire the notification telephone number "05022220001" associated with the telephone identifier "01".

Finally, the call controller 120 instructs the speech processing section 110 such that the speech processing section 110 transfers the call to the user telephone number by using, as the transmitter number, the notification telephone number identified in the previous step (step S14 of FIG. 6).

Using the example of the preceding step, the call controller 120 resultantly indicates the speech processing section 110 to issue a call to the user telephone number "09012345678" by using the transmitter number "050022220001" and the call from the telephone number 200 is also transferred.

In summary, when the telephone terminal 200 of the telephone number "0444310000" makes a telephone call to the telephone number "05011110001", the telephone terminal 210 of the telephone number "09012345678" receives a telephone call from the telephone number "05022220001".

In this example, the speech processing section 110 executes processing in which a call is once terminated and then another call is requested to be transferred; a specific operation of the speech transfer processing will be described in conjunction with processing implemented by use of the SIP (session initiation protocol). FIG. 9 is a sequence flowchart showing an example of a procedure of the speech transfer processing using SIP.

First, the telephone terminal 200 issued a call to the telephone relay apparatus 100 ((1) of FIG. 9). This call is received by the speech processing section 110 of the telephone relay apparatus 100; thereafter, the call controller 120 executes steps S11 to S14 of FIG. 6 to instruct the speech processing section 110 to transfer the call to the user telephone number by use of the notification telephone number.

And the speech processing section 110 issues the call to the telephone terminal 210 having the user telephone number, by use of the notification telephone number ((2) of FIG. 9).

And, when the telephone terminal 210 confirms call reception ((3) of FIG. 9), the speech controller 110 of the telephone relay apparatus 100 calls the telephone terminal 200 side ((4) of FIG. 9) and issues a call processing completion notification to both telephone terminals ((5) and (6) of FIG. 9).

After this point, the voice speech is enabled between the telephone terminals 200 and 210 ((7) of FIG. 9).

Although SIP is used here, the system may be implemented by use of functions of other telephone exchange networks such as PSDN (public switched data network) and ISDN (integrated services digital network).

EXAMPLE 2

The second example is another example further concretely materializing the first exemplary embodiment described above. In the operation of the above first exemplary embodiment, when referring to the notification transmitter number condition information stored in the call control information storage 130 in step S14 of FIG. 6, the call controller 120 applies, in the example described here, only the telephone number information of the transmission source to the condition to select the notification telephone number; however, if other additional information (e.g., positional information)

can be acquired via the telephone network 50 from the call-transmission-side telephone terminal 200, these additional information pieces may be employed to determine the notification transmitter number.

Moreover, it is also possible that based on the information of the call-transmission-side telephone terminal 200 obtainable from the telephone network 50, further other information is acquired by use of an external device to employ the information including these information items to determine the notification transmitter number. FIG. 10 shows a system configuration example in this case. FIG. 10 is a configuration diagram of the second example of the telephone relay system in accordance with the present invention. Incidentally, in this diagram, the same constituent components as those of FIG. 2 are assigned with the same reference numerals, and description thereof will be avoided.

Referring to FIG. 10, the second example of the telephone relay system in accordance with the present invention includes a telephone relay apparatus 100 operating under program control, telephone terminals 200 and 210, telephone networks 50-1 and 50-2 to which these telephone terminals 200 and 210 connect, and a judging information supplier 500.

Incidentally, the configuration of the telephone relay apparatus 100 is similar to that shown in FIG. 2 and hence description thereof will be avoided. The judging information supplier 500 is connected to the call controller 120 in the telephone relay apparatus 100. Three or more telephone terminals may be connected to the telephone networks 50.

Here, the judging information supplier 500 includes a function to supply other information related to the information supplied from the call controller 120. There exists, for example, a positioning device which supplies, when the telephone number of the telephone terminal 200 is given, information of the current position of the telephone terminal 200.

In a case wherein the judging information supplier 500 is employed, the call controller 120 supplies, in step S14 of FIG. 6, information of the transmission-side telephone terminal 200 obtainable from the telephone network 50 to the judging information supplier 500 before referring to the notification transmitter number condition information stored in the call control information storage 130, and to refers to the notification transmitter number condition information by using also the attained information.

EXAMPLE 3

The third example is another example further concretely materializing the second exemplary embodiment described above. For the third example, the flowchart of FIG. 1 and the configuration diagram of FIG. 7 will be referred to.

First, the telephone terminal 200 issues via the network 60 to the telephone relay apparatus 100 a speech request including, as parameter information, telephone number information, notification attribute information, and call transmission destination identifier information. The data communication processing section 140 receives this request (step S21 of FIG. 1).

In the operation, the data communication processing section 140 passes, from the request of the telephone terminal 200, the speech request together with the request source telephone number information, the notification attribute, and the call transmission destination identifier information to the call controller 120.

The call controller 120 having received the speech request identifies a user telephone number based on the call transmission destination identifier information; attains a telephone number identifier to be used, from the correspondence information (FIG. 8) between the notification attribute and the notification telephone number stored in the call control information storage 130, and refers, by use of the telephone number identifier, to the telephone number information stored in the call control information storage 130, to identify a notification telephone number based on the telephone number identifier (step S22 of FIG. 1).

Assume in this step that for example, the requester-side telephone number, i.e., the request source telephone information is "090999999999", the notification attribute is "important", and the call transmission destination identifier information is "000002". In this situation, the call controller 120 refers to the user information stored in the call control information storage 130 to search for an entry having the same user identifier as the call transmission destination identifier information to thereby identify the user telephone number.

According to the example of FIG. 3, from the entry having the user identifier of "0000002" which is the value of the call transmission destination identifier information, "09011111111" can be obtained as the user number.

Furthermore, the call controller 120 refers to the correspondence information between the notification attribute and the notification telephone number stored in the call control information storage 130 to attain a telephone number identifier to be used, which corresponds to the given notification attribute information.

When FIG. 8 is assumed as an example of the correspondence information between the notification attribute and the notification telephone number, "02" is attained as the telephone number identifier corresponding to the notification attribute "important".

And the call controller 120 refers to the telephone number information (FIG. 4) stored in the call control information storage 130 by using the telephone number identifier "02" to identify the notification telephone number based on the telephone number identifier.

When FIG. 4 is assumed as an example of the telephone number information to be applied to the call transmission destination identifier information "000002", "05022220002" can be obtained by making a search for the notification telephone number based on the telephone number identifier "02".

And the call controller 120 sends a speech instruction to the speech processing section 110 using, as parameters, the request source telephone number information and the notification telephone number.

Using the example of the previous step, the call controller 120 resultantly instructs the speech processing section 110 to issue a call to the request source telephone terminal "09099999999" and a call to the user telephone number "09011111111" by using the transmitter number "050022220002" to enable a speech between both telephone terminals.

The speech processing section 110 having received this instruction first sends a call to the telephone terminal 200 as the request source (step S23 of FIG. 1). In this example, the speech processing section 110 issues a call to the number "09099999999".

In the operation, as the number for the call transmission to the request source telephone terminal 200, an arbitrary one of the telephone numbers possessed by the telephone relay apparatus 100 is available. The number may be fixed or may vary for each user identifier.

When the request source telephone terminal 200 replies to the call, the speech processing section 110 transfers a call, by using as the transmitter number the notification telephone number identified in the preceding step, to the other one telephone terminal 210 having the user telephone number (step S24 of FIG. 1).

According to the preceding examples, the call is issued to the telephone terminal 210 having the number "09011111111" by using "05022220002" as the transmitter number.

When the telephone terminal 210 replies to the call, the speech processing section 110 connects voice of the call of the telephone terminal 200 and voice of the call of the telephone terminal 210 to enable a conversation between both parties (step S25 of FIG. 1).

The processing from steps S23 to S25 of FIG. 1 can also be implemented by use of, for example, the third party speech control scheme described in Non-Patent Document 1 described above. FIG. 11 shows an operation example of steps S23 to S25 of FIG. 1 when the third party speech control scheme is employed. FIG. 11 is a sequence chart showing an example of the procedure of processing of steps S23 to S25 of FIG. 1 when the third party speech control scheme is adopted.

When an indication to establish a speech between the telephone terminals 200 and 210 is received, the speech processing section 110 of the telephone relay apparatus 100 first sends a call to the telephone terminal 200 according to step S23 of FIG. 1 ((1) of FIG. 11).

When the telephone terminal 200 confirms reception of the call ((2) of FIG. 11), the processing section 110 transmits a call, by use of the notification telephone number, to the other one telephone terminal 210 according to step S24 of FIG. 1 ((3) of FIG. 11).

When the telephone terminal 210 also confirms reception of the call ((4) of FIG. 11), the speech processing section 110 issues a call processing completion notification to both telephone terminals according to step S25 of FIGS. 1 ((5) and (6) of FIG. 11). Accordingly, a voice speech is enabled between the telephone terminals 200 and 210 ((7) of FIG. 11).

The processing of steps S23 to S25 of FIG. 1 may be realized by other methods only if a condition "a speech is established between the telephone terminals 200 and 210 and the transmitter number to be notified to the telephone terminal 210 is the notification telephone number identified in step S22 of FIG. 1" is satisfied.

Incidentally, in the operation of the example, the call controller 120 employs in the example described here, information including indices of importance such as "urgent", "important", and "ordinary" to refer to the correspondence information between the notification attribute and the notification telephone number stored in the call control information storage 130 in step S22 of FIG. 1; however, it is possible to arbitrarily employ information related to a place such as "furniture corner" and "daily necessaries corner" and information related to time such as "reservation on the day" and "reservation for tomorrow and subsequent days". Further, as the notification attribute, the telephone number information of the request source telephone terminal 200 may also be used.

Additionally, like in the second example, it is also possible that based on the information of the notification attribute obtained from the transmission-side telephone terminal 200, further other information is acquired by use of an external device to employ the information including these other information items to determine the notification transmitter number.

EXAMPLE 4

The fourth example is another example further concretely materializing the second exemplary embodiment described above. For the fourth example, the configuration diagram of FIG. 7 and the flowchart of FIG. 12 will be referred to. FIG. 12 is a flowchart showing operation of the fourth example of the present invention.

The configuration is similar to that of FIG. 7; however, as the information of the call control information storage 130, notification transmitter number condition information (FIG. 5) is additionally disposed.

The operation of the example is similar, in the method of acquiring a request from the telephone terminal 200 as the requester, to step S21 of FIG. 1: the telephone terminal 200 issues via the network 60 to the telephone relay apparatus 100 a speech request including, as parameter information, telephone number information, notification attribute information, and call transmission destination identifier information. The data communication processing section 140 receives this request (step S31 of FIG. 12).

In the operation, the data communication processing section 140 passes, from the request of the telephone terminal 200, the speech request together with the request source telephone number information, the notification attribute, and the call transmission destination identifier information to the call controller 120.

The call controller 120 having received this speech request attains, from the correspondence information (FIG. 8) between the notification attribute and the notification telephone number stored in the call control information storage 130, a telephone number identifier to be used and then updates the notification transmitter number condition information stored in the call control information storage 130 by using the telephone number identifier (step S32 of FIG. 12).

Assume in this step that for example, the requester-side telephone number, i.e., the request source telephone information is "090999999999", the notification attribute is "ordinary", and the call transmission destination identifier information is "000001". In this situation, the call controller 120 refers to the correspondence information between the notification attribute and the notification telephone number stored in the call control information storage 130 to obtain a telephone number identifier to be used, which corresponds to the given notification attribute information.

When FIG. 8 is assumed as an example of the correspondence information between the notification attribute and the notification telephone number, "03" is attained as the telephone number identifier corresponding to the notification attribute "ordinary".

And the call controller 120 updates, by use of the telephone number identifier and the call transmission source telephone information, the notification transmitter number condition information stored in the call control information storage 130 and updates the contents of the telephone number identifier to be used for the call from the call transmission source telephone information.

When FIG. 5 is assumed as an example of the telephone number information to be applied to the call transmission destination identifier information (user identifier) "000001", a rule that if the transmitter number is "09099999999", the telephone number identifier is "03" is inserted by use of the request source telephone information "09099999999" and the telephone number identifier value "03".

And the call controller 120 notifies the telephone number of the telephone relay apparatus 100 to the request source telephone terminal 200 (step S33 of FIG. 12).

For the telephone number to be notified to the request source telephone terminal 200, the user information stored in the call control information storage 130 and the proxy telephone number attained from the specified call transmission destination identifier information are used.

In the example, since the call transmission destination identifier information is "000001", the proxy telephone number "05011110001" is attained from FIG. 3. Hence, the proxy telephone number "05011110001" is notified to the request source telephone terminal 200.

Then, when the telephone terminal 200 having received the notification of the telephone number of the telephone relay apparatus 100 issues a call to the number, the call arrives at the telephone relay apparatus 100; since, the operation thereafter is similar to that of the first exemplary embodiment shown in FIG. 6, the description thereof will be avoided.

Incidentally, in step S33 of FIG. 12 of the above operation example, the number to be notified by the telephone relay apparatus 100 is obtained from the user information stored in the call control information storage 130; however, a common number may be employed regardless of the user identifier. In this case, the notification transmitter number condition information stored in the call control information storage 130 is also a common number regardless of the user identifier.

In this regard, in both of the first and second exemplary embodiments, a telephone number selected under a predetermined condition is notified as a transmitter number to the reception-side telephone terminal 210. Hence, for example, by beforehand inputting, in a telephone directory of a telephone, a notification telephone number and "name" as a condition corresponding to the notification telephone number, the condition can be confirmed when a telephone call is received.

For example, in the case of the example of FIG. 1 of the second exemplary embodiment, if "urgent", "important", and "ordinary" are registered as names to "05022220001", "05022220002", and "05022220003" respectively, and if there is provided a function as a telephone terminal function to display the name at call reception; "urgent", "important", or "ordinary" is displayed on the telephone terminal screen in association with the notification attribute of the call transmission source.

Similarly, the notification attribute may be set as "furniture corner" and "daily necessaries corner" in relation to places and "reservation on the day" and "reservation for tomorrow and subsequent days" in relation to time.

Embodiment 5

The fifth example is associated with a program for a telephone relay method. As described above, the telephone relay apparatus 100 includes a program storage 150 (reference is to be made to FIGS. 2, 7, and 10). This program storage 150 has stored programs of the telephone relay method shown in the flowcharts of FIGS. 6, 1, and 12.

A controller (computer), not shown, of the telephone relay apparatus 100 reads the program for the telephone relay method from the program storage 150 and controls, according to the program, the speech processing section 110, the call controller 120, the call control information storage 130, and the data communication processing section 140. The contents of the control have already been described and hence description there of will be avoided here.

This application is the National Phase of PCT/JP2007/071479, filed Nov. 5, 2007, which is based upon and claims the benefit of priority from Japanese patent application No. 2006-350812, filed on Dec. 27, 2006, the disclosure of which is incorporated herein in its entirety by reference.

BRIEF DESCRIPTION OF DRAWINGS

[FIG. 3] is a diagram showing an example of the user information stored in the call control information storage 130.

[FIG. 4] is a diagram showing an example of the telephone number information stored in the call control information storage 130.

[FIG. 5] is a diagram showing an example of the notification transmitter number condition information stored in the call control information storage 130.

[FIG. 6] is a flowchart showing operation of the first exemplary embodiment of the telephone relay system in accordance with the present invention.

[FIG. 7] is a configuration diagram of the second exemplary embodiment of the telephone relay system in accordance with the present invention.

DESCRIPTION OF REFERENCE NUMERALS

Figure 1:
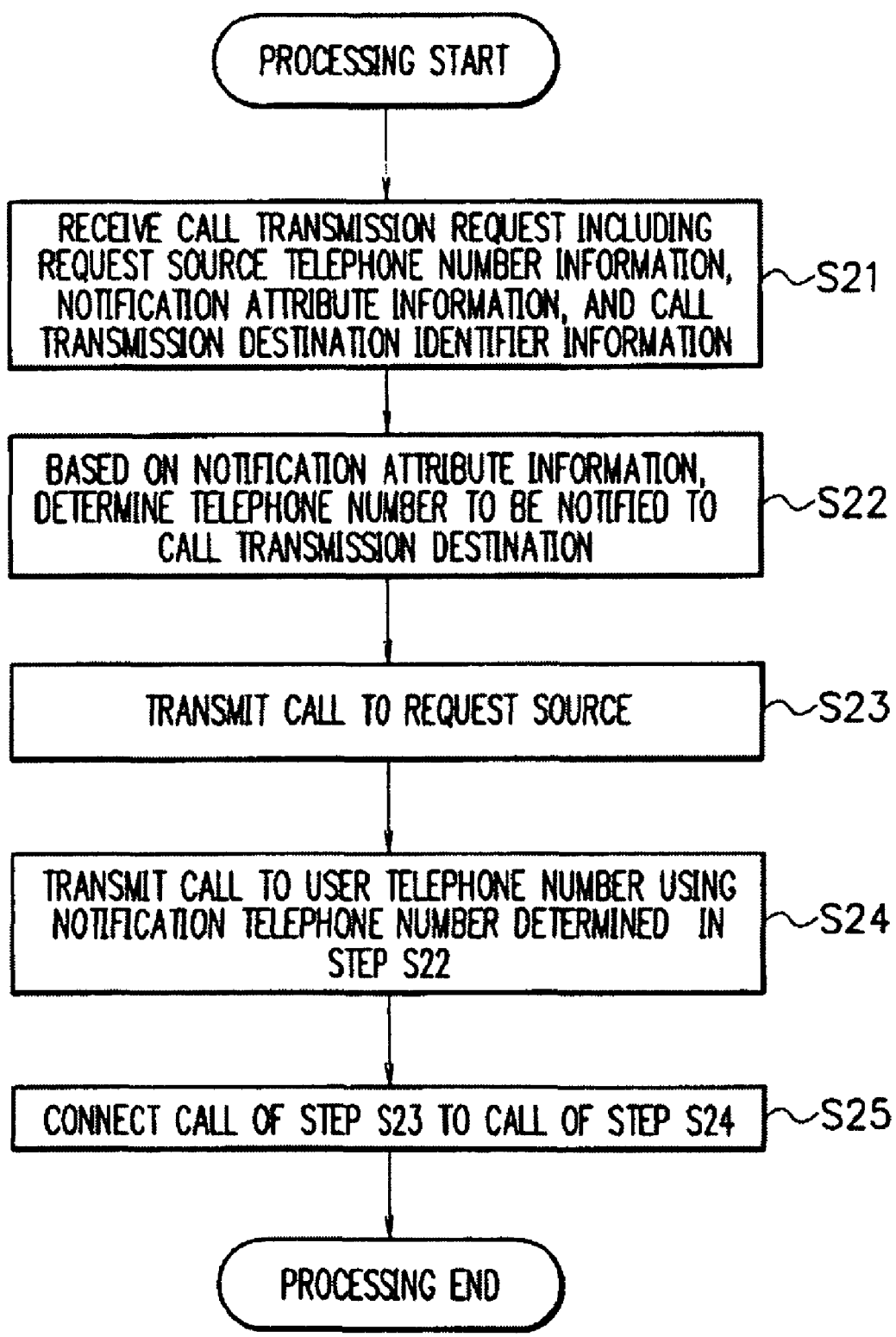
[FIG. 1] is a flowchart showing operation of the second exemplary embodiment of the telephone relay system in accordance with the present invention.
Figure 2:
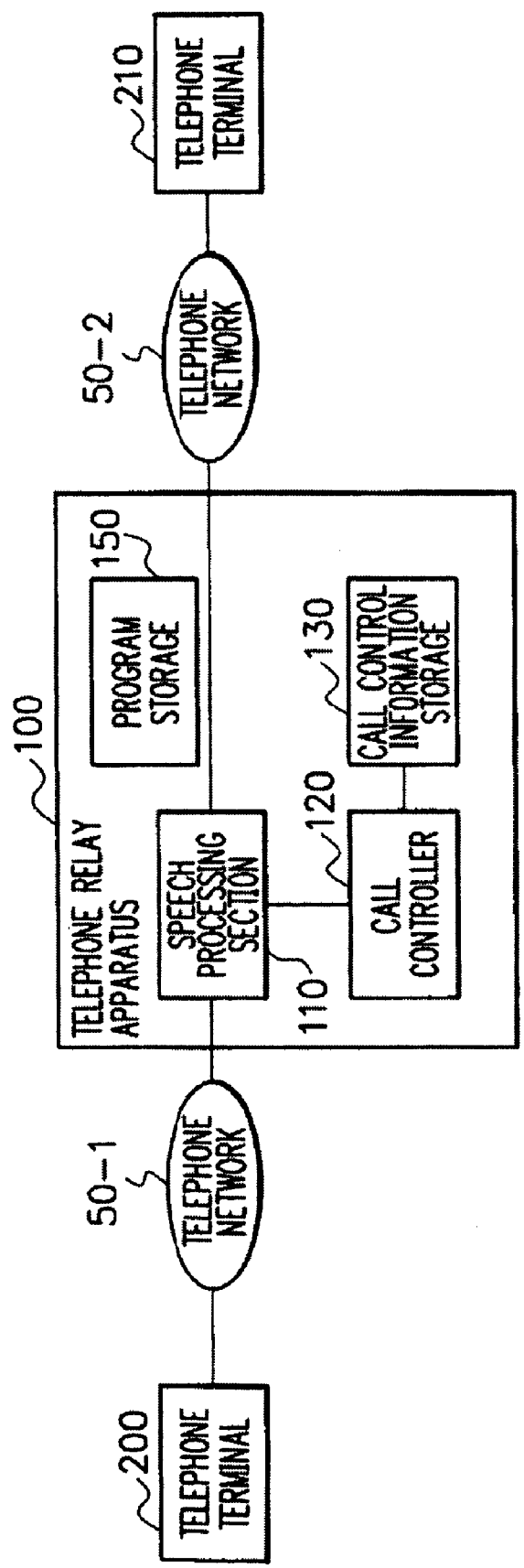
[FIG. 2] is a configuration diagram of the first exemplary embodiment of the telephone relay system in accordance with the present invention.
Figure 8:
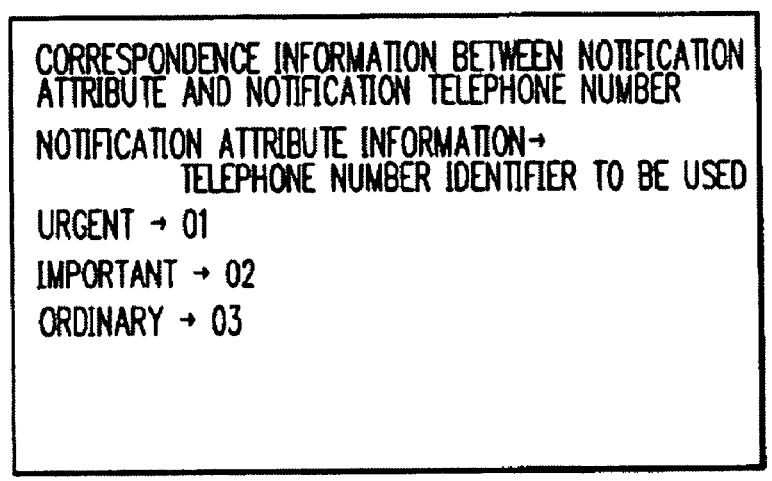
[FIG. 8] is a diagram showing an example of the correspondence information data between the notification information and the notification transmitter number stored in the call control information storage 130.
Figure 9:
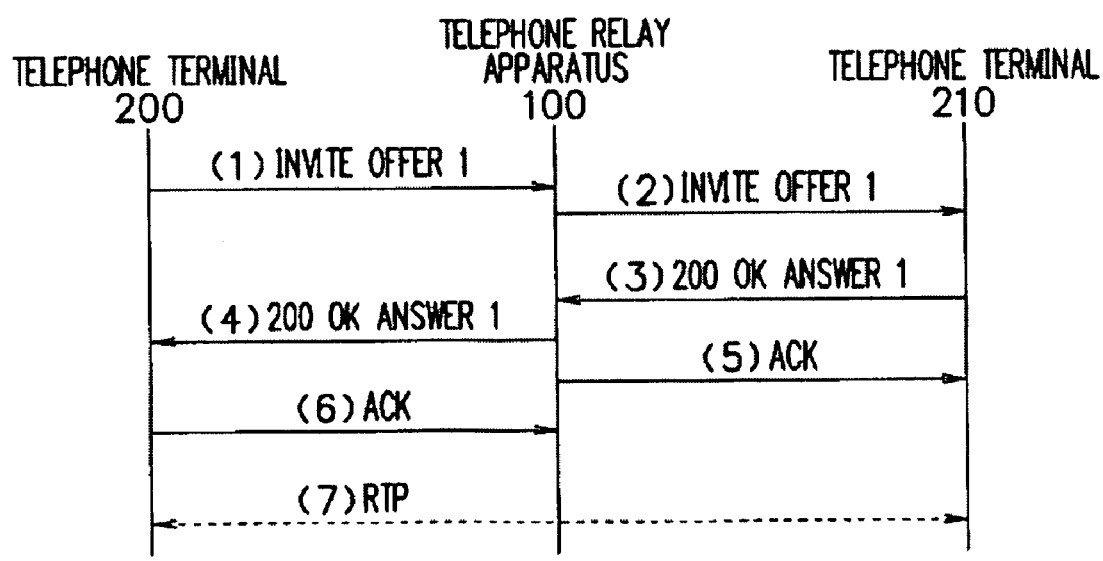
[FIG. 9] is a sequence flowchart showing an example of the procedure of the speech transfer processing using SIP.
Figure 10:
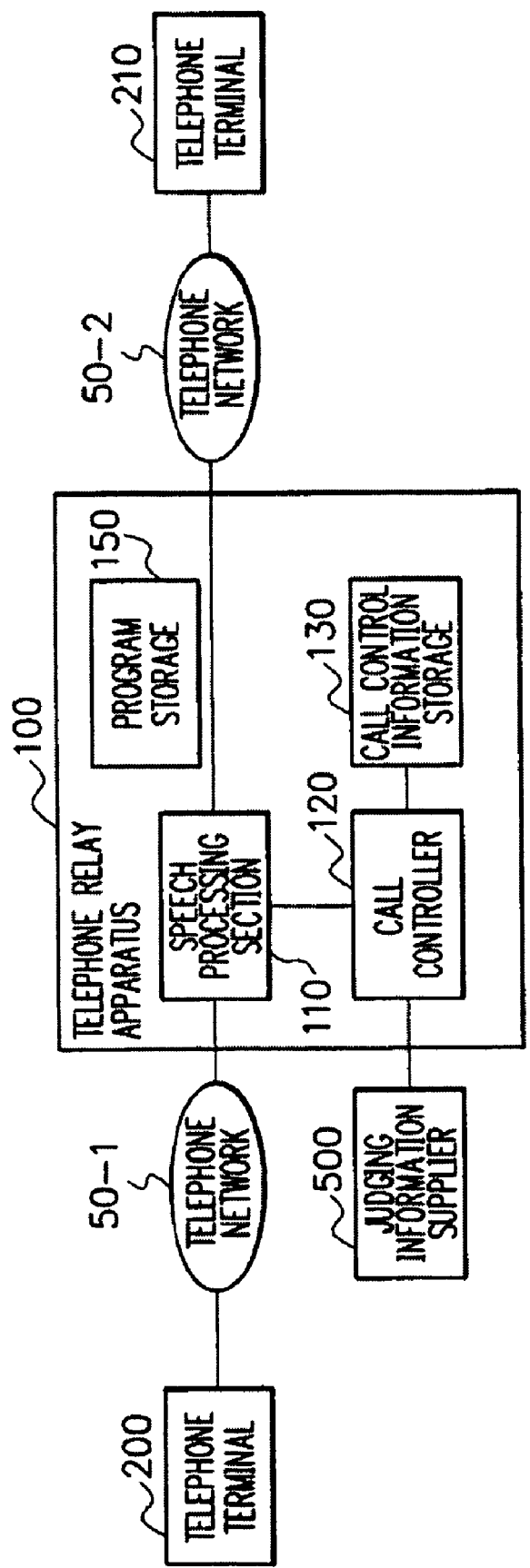
[FIG. 10] is a configuration diagram of the second example of the telephone relay system in accordance with the present invention.
Figure 11:
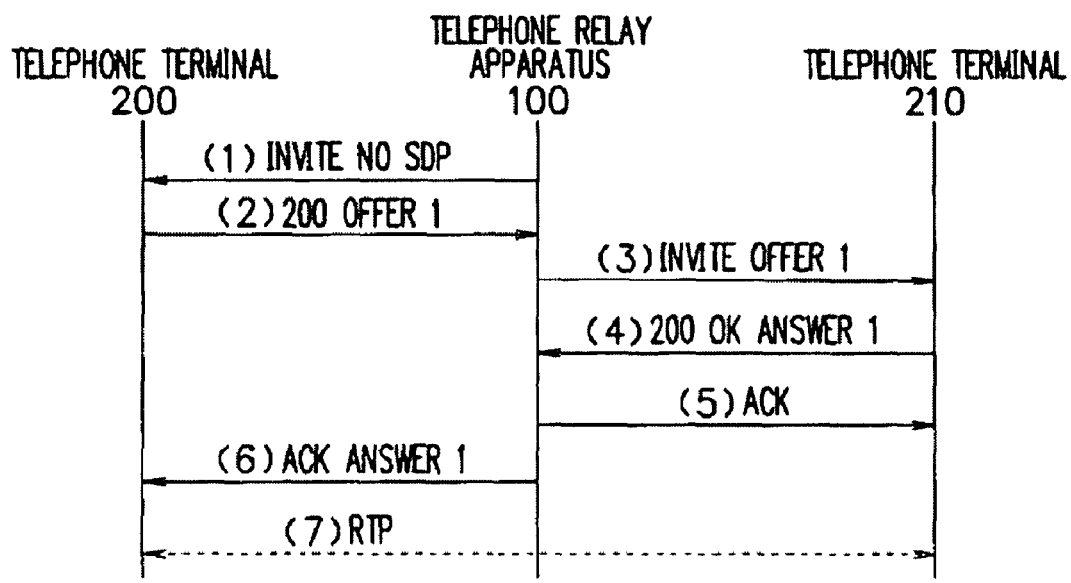
[FIG. 11] is a sequence flowchart showing an example of the procedure of the processing of steps S23 to S25 of FIG. 8 using the third party speech control scheme.
Figure 12:
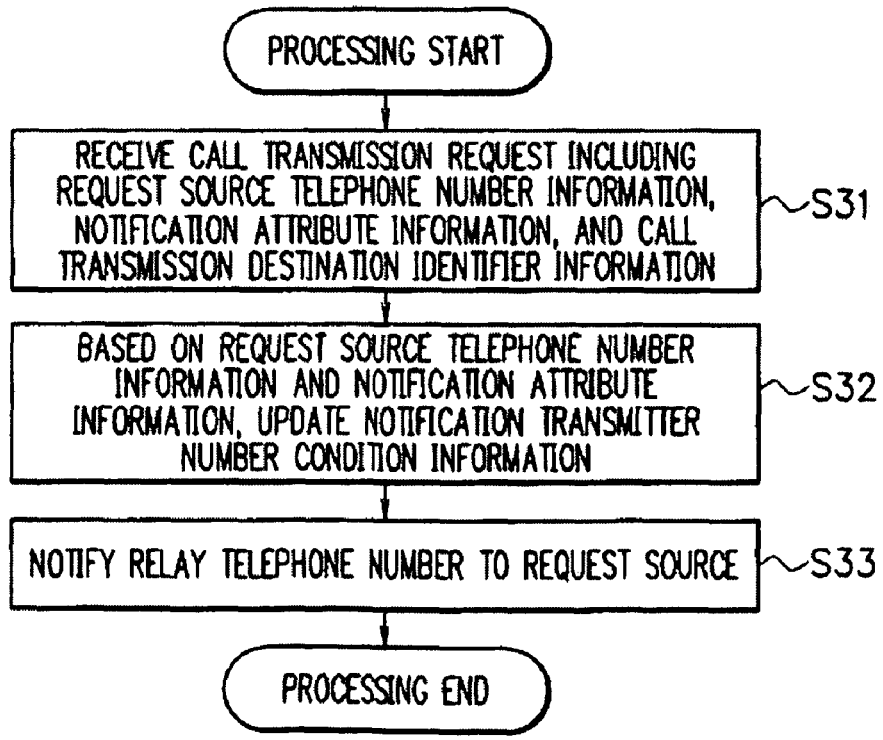
[FIG. 12] is a flowchart showing operation of the fourth example of the telephone relay system of the present invention.

50 Telephone network
60 Network
100 Telephone relay apparatus
110 Speech processing section
120 Call controller
130 Call control information storage
140 Data communication processing section
150 Program storage
200, 210 Telephone terminal
500 Judging information supplier

The invention claimed is:

1. A telephone relay system in which a telephone relay apparatus receives a call transmitted from a first telephone terminal to transfer the call to a second telephone terminal, wherein the telephone relay apparatus comprises:
   a user information storage which stores a proxy telephone number to be employed when a call is transmitted from the first telephone terminal to the telephone relay apparatus, and a user identifier and a user telephone number of a transfer destination which are disposed in association with the proxy telephone number;
   a notification transmitter number information which stores information of a correspondence between a telephone number of the first telephone terminal which are transmitted to the telephone relay apparatus when the call is transmitted from the first telephone terminal to the telephone relay apparatus and a telephone number identifier, the information disposed in association with the user identifier;

a telephone number information storage which stores information of a correspondence between the telephone number identifier and a notification telephone number; and a call controller which identifies the notification telephone number based on the proxy telephone number employed when the call is transmitted to the telephone relay apparatus, and transfers the call to the user telephone number by use of the notification telephone number.

2. The telephone relay system in accordance with claim 1, comprising an attribute telephone number correspondence information storage which stores information of a correspondence between a notification attribute and the telephone number identifier, wherein the call controller identifies the notification telephone number based on the notification attribute and the telephone number of the first telephone terminal which are transmitted to issue a call from the first telephone terminal to the telephone relay apparatus and the user identifier, and transfers the call to the user telephone number by use of the notification telephone number.

3. The telephone relay system in accordance with claim 2, wherein the call controller updates notification transmitter number condition information to be stored in the telephone number information storage, by use of the telephone number identifier corresponding to the notification attribute and the telephone number of the first telephone terminal.

4. A telephone relay apparatus for use with a telephone relay system in which the telephone relay apparatus receives a call transmitted from a first telephone terminal to transfer the call to a second telephone terminal, comprising:

a user information storage which stores a proxy telephone number to be employed when a call is transmitted from the first telephone terminal to the telephone relay apparatus, and a user identifier and a user telephone number of a transfer destination which are disposed in association with the proxy telephone number;

a notification transmitter number information storage which stores information of a correspondence between a telephone number of the first telephone terminal which are transmitted to the telephone relay apparatus when the call is issued from the first telephone terminal to the telephone relay apparatus and a telephone number identifier, the information disposed in association with the user identifier;

a telephone number information storage which stores information of a correspondence between the telephone number identifier and a notification telephone number; and a call controller which identifies the notification telephone number based on the proxy telephone number employed when the call is transmitted to the telephone relay apparatus, and transfers the call to the user telephone number by use of the notification telephone number.

5. The telephone relay apparatus in accordance with claim 4, comprising an attribute telephone number correspondence information storage which stores information of a correspondence between a notification attribute and the telephone number identifier, wherein the call controller identifies the notification telephone number based on the notification attribute and the telephone number of the first telephone terminal which are transmitted to issue a call from the first telephone terminal to the telephone relay apparatus and the user identifier, and transfers the call to the user telephone number by use of the notification telephone number.

6. The telephone relay apparatus in accordance with claim 5, wherein the call controller updates notification transmitter number condition information to be stored in the telephone number information storage, by use of the telephone number identifier corresponding to the notification attribute and the telephone number of the first telephone terminal.

7. A telephone relay method in which a telephone relay apparatus receives a call transmitted from a first telephone terminal to transfer the call to a second telephone terminal, wherein the telephone relay apparatus comprises:

a user information storage for storing a proxy telephone number to be employed when a call is transmitted from the first telephone terminal to the telephone relay apparatus, and a user identifier and a user telephone number of a transfer destination which are disposed in association with the proxy telephone number;

a notification transmitter number information storage for storing information of a correspondence between a telephone number of the first telephone terminal which are transmitted to the telephone relay apparatus when the call is transmitted from the first telephone terminal to the telephone relay apparatus and a telephone number identifier, the information disposed in association with the user identifier; and a telephone number information storage for storing information of a correspondence between the telephone number identifier and a notification telephone number, wherein the telephone relay apparatus comprises a call control step for identifying the notification telephone number based on the proxy telephone number employed when the call is transmitted to the telephone relay apparatus, and transferring the call to the user telephone number by use of the notification telephone number.

8. The telephone relay method in accordance with claim 7, characterized in that:

the telephone relay apparatus comprises an attribute telephone number correspondence information storage for storing information of a correspondence between a notification attribute and the telephone number identifier, wherein the call control step identifies the notification telephone number based on the notification attribute and the telephone number of the first telephone terminal which are transmitted to issue a call from the first telephone terminal to the telephone relay apparatus and the user identifier, and transfers the call to the user telephone number by use of the notification telephone number.

9. The telephone relay method in accordance with claim 8, wherein the call control step updates notification transmitter number condition information to be stored in the telephone number information storage, by use of the telephone number identifier corresponding to the notification attribute and the telephone number of the first telephone terminal.

10. A non-transitory storage medium for storing a program for a telephone relay method in which a telephone relay apparatus receives a call transmitted from a first telephone terminal to transfer the call to a second telephone terminal, wherein the telephone relay apparatus comprises:

a user information storage for storing a proxy telephone number to be employed when a call is transmitted from the first telephone terminal to the telephone relay apparatus, and a user identifier and a user telephone number of a transfer destination which are disposed in association with the proxy telephone number;

a notification transmitter number information storage for storing information of a correspondence between a telephone number of the first telephone terminal which are transmitted to the telephone relay apparatus when the call is transmitted from the first telephone terminal to the telephone relay apparatus and a telephone number identifier, the information disposed in association with the user identifier; and a telephone number information storage for storing information of a correspondence between the telephone number identifier and a notification telephone number, wherein the program making a computer execute a call control step disposed in the telephone relay apparatus for identifying the notification telephone number based on the proxy telephone number employed when the call is transmitted to the telephone relay apparatus, and transferring the call to the user telephone number by use of the notification telephone number.

11. The non-transitory storage medium for storing the program in accordance with claim 10, wherein:

the telephone relay apparatus comprises an attribute telephone number correspondence information storage for storing information of a correspondence between a notification attribute and the telephone number identifier, wherein the call control step identifies the notification telephone number based on the notification attribute and the telephone number of the first telephone terminal which are transmitted to transmit a call from the first telephone terminal to the telephone relay apparatus and the user identifier, and transfers the call to the user telephone number by use of the notification telephone number.

12. The storage medium for storing the program in accordance with claim 11, wherein the call control step updates notification transmitter number condition information to be stored in the telephone number information storage, by use of the telephone number identifier corresponding to the notification attribute and the telephone number of the first telephone terminal.

13. A telephone relay system in which a telephone relay apparatus receives a call transmitted from a first telephone terminal to transfer the call to a second telephone terminal, wherein the telephone relay apparatus comprises:

user information storage means for storing a proxy telephone number to be employed when a call is transmitted from the first telephone terminal to the telephone relay apparatus, and a user identifier and a user telephone number of a transfer destination which are disposed in association with the proxy telephone number;

notification transmitter number information storage means for storing information of a correspondence between a telephone number of the first telephone terminal which are transmitted to the telephone relay apparatus when the call is transmitted from the first telephone terminal to the telephone relay apparatus and a telephone number identifier, the information disposed in association with the user identifier;

telephone number information storage means for storing information of a correspondence between the telephone number identifier and a notification telephone number; and call control means for identifying the notification telephone number based on the proxy telephone number employed when the call is transmitted to the telephone relay apparatus, and transferring the call to the user telephone number by use of the notification telephone number.

14. A telephone relay apparatus for use with a telephone relay system in which the telephone relay apparatus receives a call transmitted from a first telephone terminal to transfer the call to a second telephone terminal, comprising:

user information storage means for storing a proxy telephone number to be employed when a call is transmitted from the first telephone terminal to the telephone relay apparatus, and a user identifier and a user telephone number of a transfer destination which are disposed in association with the proxy telephone number;

notification transmitter number information storage means for storing information of a correspondence between a telephone number of the first telephone terminal which are transmitted to the telephone relay apparatus when the call is issued from the first telephone terminal to the telephone relay apparatus and a telephone number identifier, the information disposed in association with the user identifier;

telephone number information storage means for storing information of a correspondence between the telephone number identifier and a notification telephone number; and call control means for identifying the notification telephone number based on the proxy telephone number employed when the call is transmitted to the telephone relay apparatus, and transferring the call to the user telephone number by use of the notification telephone number.

* * * * *